United States Patent [19]

Drayton

[11] 4,309,052
[45] Jan. 5, 1982

[54] SAFETY HOOK

[75] Inventor: Walker E. Drayton, York, Pa.

[73] Assignee: Acco Industries Inc., Bridgeport, Conn.

[21] Appl. No.: 128,183

[22] Filed: Mar. 7, 1980

[51] Int. Cl.³ .............................................. B66C 1/36
[52] U.S. Cl. ............................ 294/82 R; 24/241 PP; 24/232 R
[58] Field of Search ............... 294/82 R, 78 R, 83 R; 24/230.5 R, 232, 239, 241 P, 241 PP, 241 PS, 241 PL, 241 SL, 241 SP, 242; 59/93

[56] References Cited

U.S. PATENT DOCUMENTS

| Re. 28,709 | 2/1976 | Crook, Jr. | 294/82 |
| 1,289,616 | 12/1918 | Berger | 24/241 |
| 2,857,644 | 10/1958 | Gale | 24/232 |
| 3,785,015 | 1/1974 | Dorton | 294/82 |
| 3,940,173 | 2/1976 | Ulbing | 24/241 PS |
| 4,070,823 | 1/1978 | Schreyer | 59/93 |

FOREIGN PATENT DOCUMENTS 40637 1/1970 Australia .
1430543 3/1976 United Kingdom .

Primary Examiner—James B. Marbert
Attorney, Agent, or Firm—Pennie & Edmonds

[57] ABSTRACT

A safety hook having a hook body and a safety latch rotatable to open and closed positions with respect to the hook body. An axlepin is fixed with respect to the latch and extends through and is rotatable with respect to portions of the hook body. The axlepin has locking surfaces adapted to engage a locking pawl whereby the latch may be locked against rotational movement with respect to the hook body.

8 Claims, 14 Drawing Figures

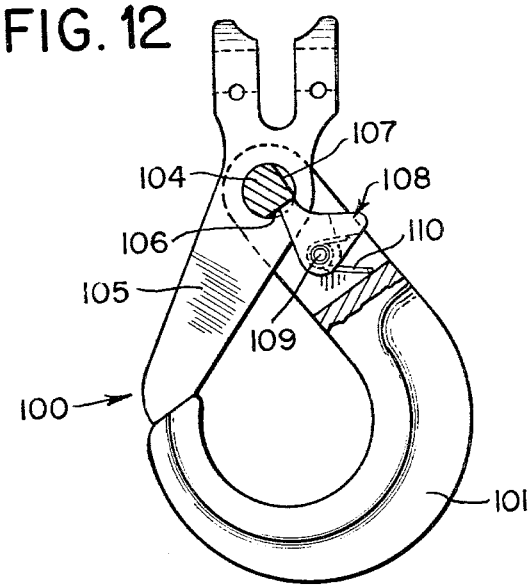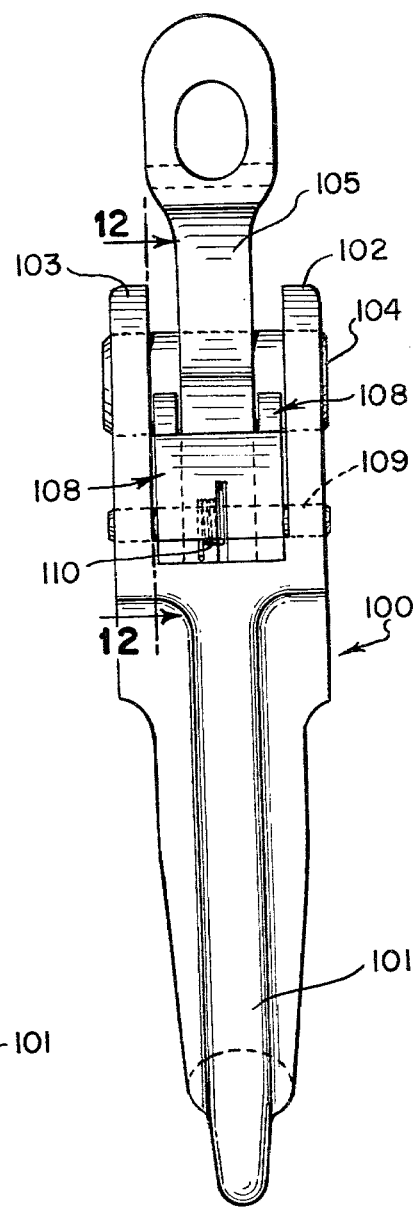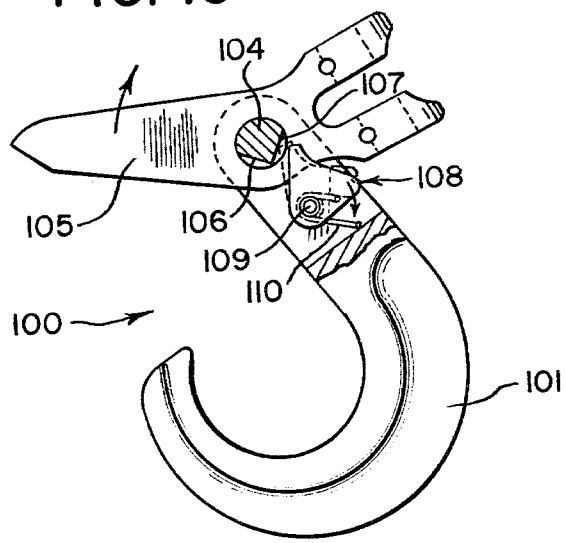

SAFETY HOOK

FIELD OF THE INVENTION

The invention relates to a safety hook construction including a curved hook body and a safety latch which is rotatable to open and closed positions whereby a load may be connected to and disconnected from the hook body.

BACKGROUND OF THE INVENTION

Safety hooks have been proposed and utilized in the past which include a curved hook body combined with a rotatable safety latch which may be moved to open and closed positions so that chains or slings supporting a load may be disconnected from or connected to the hook body. Many of these safety hook constructions have utilized locking means to prevent inadvertent movement of the latch to an open position to prevent the hook accidentally becoming disconnected from its load. The locking means used in many such safety hooks were not positioned such that the locking means could be easily unlocked using the fingers of one hand. Further placement of some of the locking means required the operator to place his fingers or hand inside the bowl within the hook body thus subjecting the hand to pinching or crushing between the hook body and the chain or sling connected to the load.

In some conventional safety hook assemblies, the latch is mounted for rotation about a load or axle pin which in turn is connected to the hook body and which extends between spaced ear portions of the hook body. In such constructions, the ends of the axlepin are headed or swaged or retaining caps are used in hook body ear holes to prevent disengagement of the axlepin from the hook body. Wear or damage between the latch and the load pin is not readily observable in such constructions because the ear portions of the hook body interfere with visual inspection of the fit between the load pin and latch.

It is therefore an object of my invention to provide for a safety hook which will include a locking means to prevent inadvertent rotation of a latch with respect to a hook body and which may be readily manipulated with one hand so allowing the latch to be easily released. The locking means is further so positioned that it is not necessary for the operator to place his hands inside the bowl of the hook body so reducing possibility of pinching or crushing the hand.

It is a further object of the invention to provide a safety hook construction wherein the fit between movable parts is readily accessible for visual inspection for wear or damage to the parts.

GENERAL DESCRIPTION OF THE INVENTION

Broadly a safety hook constructed according to the invention comprises a hook body having a bifurcated end which defines two spaced ear portions. A safety latch extends between the spaced ear portions and is connected to an axlepin which in turn extends through the ear portions and is rotatable therewith. The connection between the latch and the axlepin is fixed, preferably comprising a force fit so that there is no relative rotational movement between the two parts. Further the fixed relationship between the axlepin and latch eliminates any need of heading or swaging the ends of the axlepin or of using retaining caps to prevent axial movement of the axlepin with the hook body. The axlepin has a locking surface thereon adapted to be engaged by a locking pawl which in turn is urged by spring means into engagement with the locking surface. When the locking pawl engages the locking surface on the axlepin, the axlepin and consequently the latch are prevented from rotational movement with respect to the hook body.

In one embodiment of the invention the axlepin is barrel-shaped and includes a slot on one end which serves as a locking surface. A locking pawl in the form of a T-shaped pin having a head portion and a shank portion extends through the barrel and the head portion is adapted to engage the slot in the end of the axlepin and also a slot in the hook body so as to lock rotation of the axlepin and attached latch with respect to the hook body. The shank portion of the T-shaped pin is biased by a spring such that the head portion is urged towards the slot in the axlepin. The end of the T-shaped pin opposite the head portion has a push button attachment by which the T-shaped pin may be moved against the spring such that the head portion disengages from the slot in the axlepin allowing the latch to be moved to an open position with respect to the hook body.

In a further embodiment of the invention the locking means comprises a locking pawl which is rotatably mounted on the side of the hook body and which has a surface engaging the locking surface on the axlepin. Spring means are provided for rotating the pawl into engagement with the locking surface.

In a still further embodiment of the invention, the locking pawl comprises a push button mounted on the side of the hook body which is urged by spring means outwardly of the hook body so as to engage the locking surface of the axlepin. Movement of the push button inwardly of the hook body against the spring means unlocks the axlepin for rotational movement and allows the latch to be moved to an open position with respect to the hook body.

In a still further embodiment of the invention, the locking pawl is positioned between the ear portions of the bifurcated end of a hook body. The locking pawl is urged by spring means into locking engagement with the axlepin.

In all embodiments of the invention with the exception of the last one described above, a protective shroud is preferably included on a side of the hook body so as to extend beyond the locking pawl to prevent its being accidentally moved to a detenting or unlocked position because of contact with an external object. In the last embodiment described above, the ear portions of the hook body provide protection to the pawl against contact by external objects.

BRIEF DESCRIPTION OF THE DRAWINGS

FIG. 12 is a partial sectional front view of a further embodiment of a safety hook constructed according to the invention with the safety latch in the closed position;

FIG. 13 is a view of the safety hook of FIG. 12 with the latch in the open position; and FIG. 14 is an enlarged end view of the safety hook of FIG. 12.

BEST MODES FOR CARRYING OUT THE INVENTION

Figure 1:
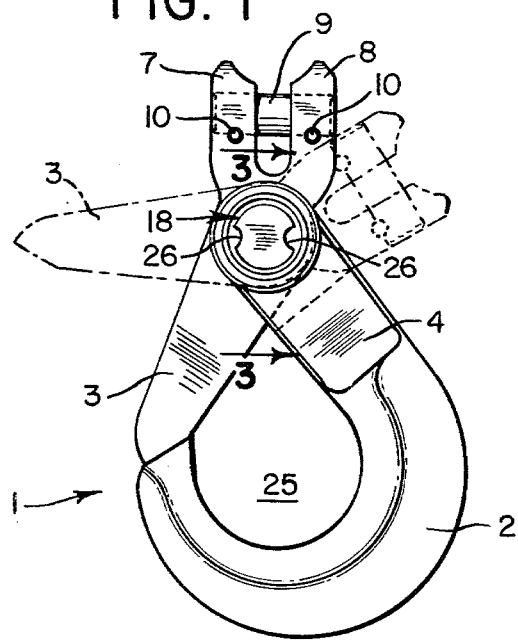
FIG. 1 is a front view of a safety hook constructed according to the invention.

Referring to FIGS. 1-4 there is illustrated a safety hook 1 having a hook body 2 and a movable safety latch 3. The hook body is bifurcated at its upper end to form two spaced ear portions 4 and 5 through which a barrel shaped axlepin 6 extends. The axlepin 6 also extends through the latch 3 and is fixed therewith, preferably by a force fit, so that there is no relative movement between the axlepin and latch.

The latch 3 has a clevis portion at its upper end forming arms 7 and 8 through which a pin 9 extends and to which a chain or sling may be connected. The pin 9 is retained in the arms 7 and 8 by means of retaining pins 10.

Figure 2:
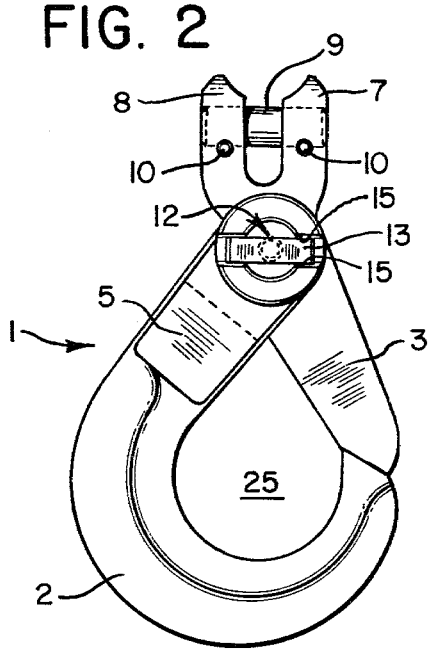
FIG. 2 is a rear view of the safety hook of FIG. 1.

The axlepin 6 has a slot 11 in one end which forms a locking surface. A T-shaped pin 12 having a head portion 13 and a shank portion 14 extends through the axlepin 6 with the head portion 13 adapted to engage the sides of a slot 15 contained in the ear portion 5 of the hook body as shown in FIG. 2. The ends of the ear portions 4 and 5 of the hook body terminate in bosses 16 and 17 with the boss 16 having the slot 15 therein which coincides with slot 11. The opposite end of the shank portion 14 of the pin from the head portion 13 has a push button 18 threaded thereon. A spring 19 is positioned around the shank portion and engages a shoulder 20 at one end contained in the axlepin and a shoulder 21 contained on the push button 18.

Figure 3:
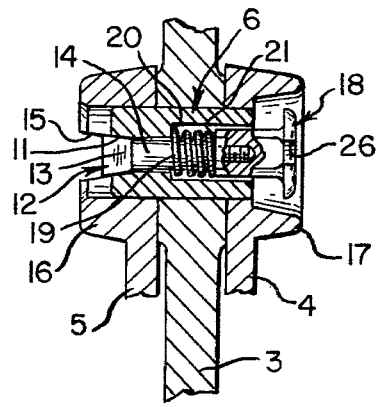
FIG. 3 is an enlarged sectional view of a portion of the safety hook of FIG. 1 taken along lines 3—3 illustrating the locking pawl in a locked position.

As shown in FIG. 3, when the head portion 13 of the T-shaped pin is urged to the right by means of the spring 19, the head portion will engage the sides of the slot 11 of the axlepin and also the sides of the slot 15 of the hook body. The head portion will then lock the axlepin 6 against relative rotation with respect to the hook body and, since the axlepin is force-fitted with the latch 3, the latch will be locked against relative rotation with respect to the hook body. In this form of the invention, the push button 18, T-shaped pin 12 together comprise a locking pawl while the sides of the slot 11 comprise a locking surface.

Figure 4:
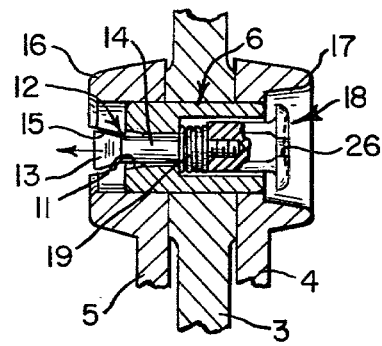
FIG. 4 is a view similar to FIG. 3 illustrating the locking pawl in an unlocked position.

When it is desired to open the latch to the open position as shown by the dotted lines in FIG. 1, the push button 18 is moved inwardly of the axlepin as shown in FIG. 4 which will then move the head portion to the left so that it will no longer engage with the sides of the slot 11 contained in the axlepin. The latch 3 will then be free to be moved to an open position whereby a chain or sling may be inserted into or removed from the bowl section 25 of the hook body.

The construction of the safety hook allows for easy manipulation by one hand. The thumb of the operator is placed on the push button and the index finger of the same hand is placed on the opposite side of the ear 5 so that movement of the index finger toward the thumb will move the latch to the open position while the push button 18 is depressed. This operator therefore does not have to insert his fingers and hand within the bowl section 25 thus avoiding possibility of crushing of the fingers between the chain or sling and the hook body.

As shown in FIGS. 3 and 4, the bosses 16 and 17 extend beyond the push button 18 and the head portion 13 thus providing protection against accidental movement of the push button caused by contact with external objects.

The push button 18 may be furnished with cutouts 26 to facilitate engagement of the push button by pliers when the push button is threaded onto the shank portion 14 of the T-shaped pin.

A feature of this particular embodiment of the invention is that the location of the push button-locking pawl assembly within axlepin 6 eliminates any need for mounting any detenting structure onto the hook body itself. This results in a shorter, light hook body and also eliminates locating any mounting holes within the hook body which could result in weakening of the hook body structure.

Figure 5:
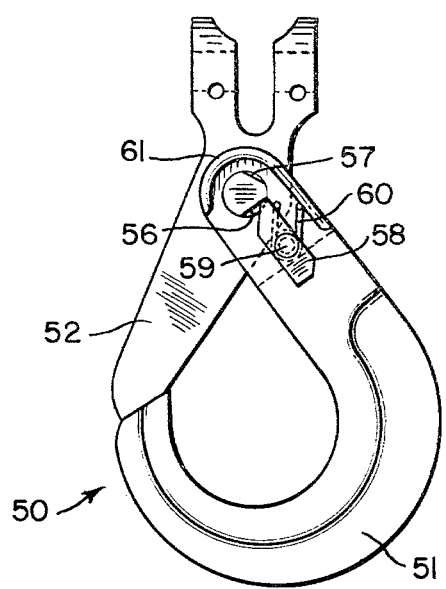
FIG. 5 is a front view of a further embodiment of a safety hook constructed according to the invention with the safety latch in the closed position.
Figure 7:
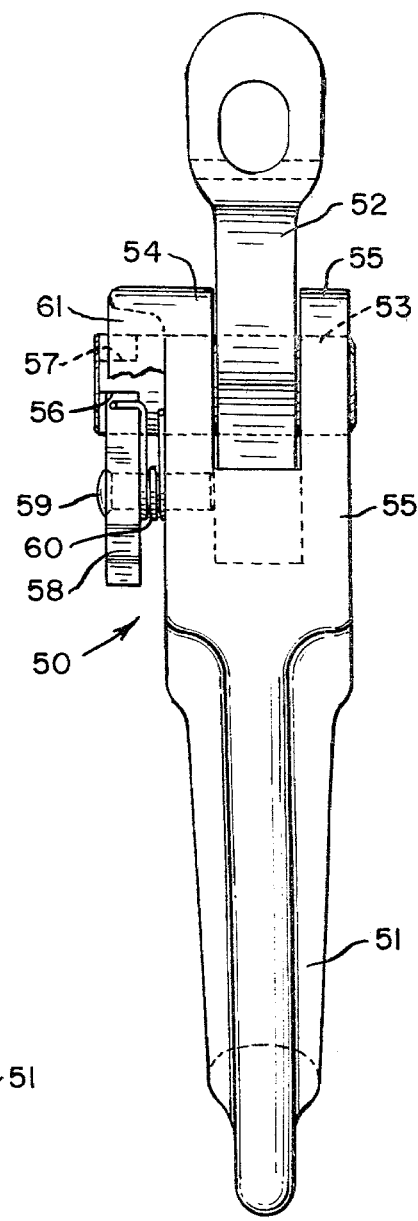
FIG. 7 is an enlarged end view of the safety hook of FIG. 5.
Figure 6:
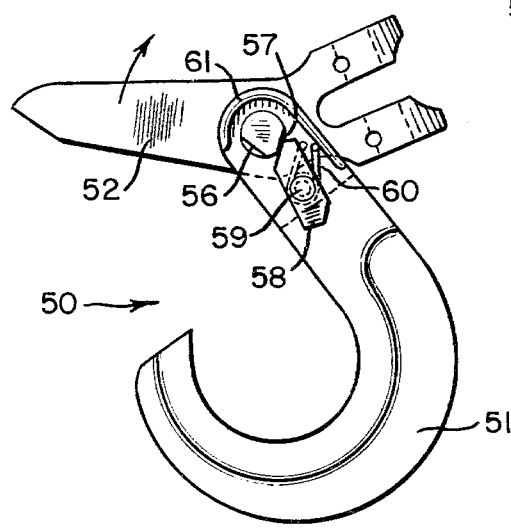
FIG. 6 is a view of the safety hook of FIG. 5 with the safety latch in the open position.
Figure 8:
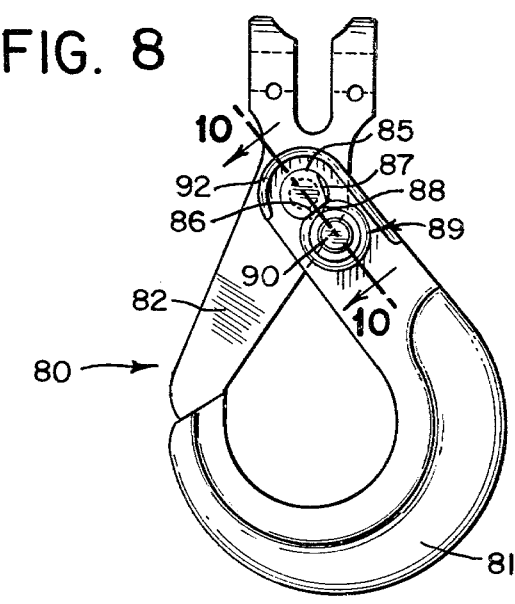
FIG. 8 is a front view of a further embodiment of a safety hook constructed according to the invention with the safety latch in the closed position.

Referring to FIGS. 5-7, there is illustrated a further embodiment of a safety hook 50 constructed according to the invention comprising a hook body 51 and a movable safety latch 52. As shown in FIG. 7, an axlepin 53 extends between spaced ear portions 54 and 55 of a bifurcated end of the hook body and also through the latch 52. The axlepin 53 is force-fitted within the latch 52 so that relative rotation between the parts is prevented. The axlepin is provided with locking surfaces 56 and 57. A locking pawl 58 is rotatably mounted on a pin 59 on the side of the hook body 51 and is urged by means of a spring 60 so as to engage locking surface 56 when the latch is in the closed and locked position as shown in FIG. 5. The pawl engages the surface 57 to hold the latch in the open position as shown in FIG. 6. A protective shroud 61 forms part of the ear portion 54 and extends beyond the pawl 58 to provide protection against accidental detenting caused by the pawl contacting external objects.

The hook construction shown in FIGS. 5-7 is susceptible for operation by one hand in the same manner as the embodiment of FIGS. 1-4, that is the thumb of the operator may be used to move pawl 58 while the index finger of the same hand may be used to rotate the latch to the open position. Release of thumb pressure on the pawl when the latch is in the open position will result in the latch being held open since the pawl will bear on the surface 57. The latch may be easily moved to the closed position by exerting a closing force on the latch. As with the construction of the embodiment shown in FIGS. 1-4, the operator at no time must insert a finger or part of his hand within the bowl section of the hook body thus reducing possibility of injury.

Figure 10:
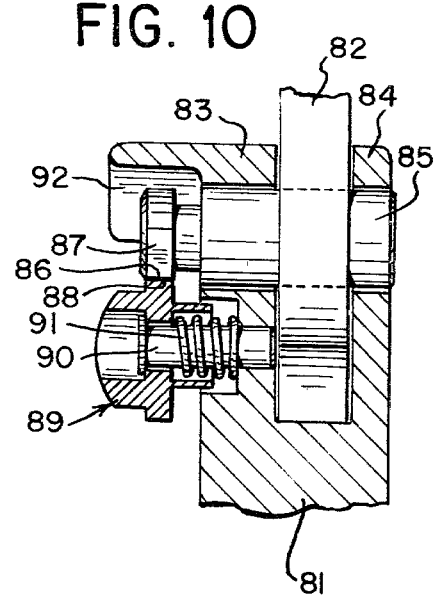
FIG. 10 is an enlarged sectional view of a portion of FIG. 8 taken along lines 10—10 with the locking pawl in the locked position.
Figure 9:
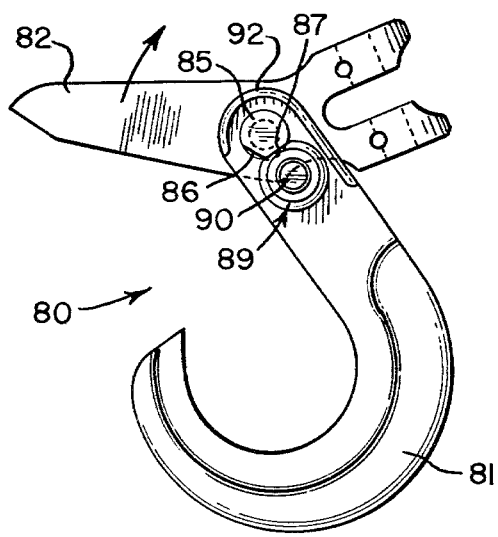
FIG. 9 is a view of the safety hook of FIG. 8 with the latch shown in the open position.
Figure 11:
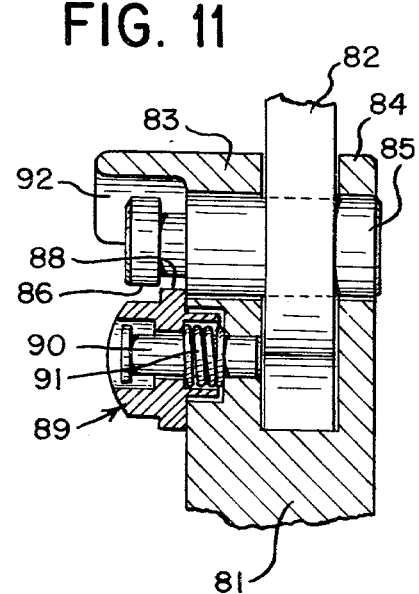
FIG. 11 is a view similar to FIG. 10 with the locking pawl in the unlocked position.

A still further embodiment 80 of a safety hook constructed according to the invention is illustrated in FIGS. 8-11 where the hook includes a hook body 81 and a safety latch 82. As shown in FIG. 10, the hook body is bifurcated at its end to form ear portions 83 and 84. An axlepin 85 extends through the ear portions and is force-fitted with latch 82. As with the axlepin of the embodiment of FIGS. 5-7, the axlepin has locking surfaces 86 and 87 thereon adapted to engage with a flat surface 88 of a locking pawl 89 in the form of a push button slidably mounted on a pin 90 mounted in the side of the hook body 81. The push button locking pawl 89 is urged outwardly of the hook body by a spring 91 such that surface 88 engages locking surface 86 of the axlepin as shown in FIG. 10. The locking pawl 89 is moved in a detenting or unlocking position by pushing the pawl inwardly towards the hook body 81 against the force of the spring 91 as shown in FIG. 11 so that the flat surface 88 of the pawl is disengaged from the locking surface 86.

A protective shroud 92 on the ear portion 83 extends beyond the axlepin 85 and the pawl 89 to provide protection against accidental movement by contact with exterior objects.

The construction of the safety hook illustrated in FIGS. 8-11 is susceptible to the one hand operation in the same manner as with the embodiment of FIGS. 5-7.

Referring to FIGS. 12-14, a still further embodiment of a safety hook 100 constructed according to the invention is illustrated in which the locking pawl is positioned between and protected by the bifurcated ends of the hook body. As shown the hook body 101 has a bifurcated end forming ear portions 102 and 103 through which an axlepin 104 extends. Axlepin 104 is force-fitted with a latch 105 which also extends between the ear portions. The axlepin 104 has locking surfaces 106 and 107 thereon adapted to be engaged by locking pawl 108. Locking pawl 108 is rotatably mounted about pin 109 which, as shown in FIG. 14, extends between ear portions 102 and 103. A spring 110 urges the pawl in a counterclockwise direction as shown in FIG. 12 so as to engage the locking surface 106. When the latch of the safety hook is to be moved to the open position as shown in FIG. 13, the operator moves the pawl 108 in a clockwise direction by thumb pressure while at the same time moving the latch 105 in a clockwise direction by means of the index finger of the same hand. Release of thumb pressure while the latch is in the open position will result in the latch remaining in the open position since the latch will engage surface 107. The latch may be easily moved to the closed position by a slight pressure in a counterclockwise direction.

As seen in the drawings all of the embodiments are susceptible of one hand operation without the necessity of the operator inserting any part of his hand into the bowl section of the hook.

Further the embodiments of FIGS. 1-11 all have a protective shroud to prevent accidental engagement of the locking pawls by external objects while the embodiment of FIGS. 12-14 utilizes the ear portions of the hook body itself to provide protection against accidental engagement of the pawl by external objects.

Further in all of the embodiments of the invention, relative wear or damage between the axlepin, which is load bearing, and the holes in the ear portions through which the axlepin extends may be easily inspected. This is because the axlepin rotates relative to the hook body. In prior art designs where the latch is rotatable about an axlepin or load pin, wear or damage between the latch and the axlepin cannot be readily or easily observed because of the location of the latch between the ear portions of the hook body.

I claim:

1. A safety hook comprising a hook body having a bowl section, a bifurcated end defining two spaced ear portions, a latch extending between said spaced ear portions, and an axlepin extending through said ear portions and said latch to rotatably connect said latch with respect to said hook body whereby said latch may be moved to open and closed positions with respect to said hook body; the improvement comprising in that said axlepin is fixed with respect to said latch whereby relative movement between said latch and said axlepin is prevented, in that said axlepin has a locking surface thereon, in having a locking pawl adapted to engage said locking surface to lock said axlepin and latch against rotational movement with respect to said hook body, in having spring means for urging said locking pawl into engagement with said locking surface, and in that said locking pawl includes a finger actuation surface thereon positioned outside said bowl section and closely adjacent said axlepin whereby said pawl may be moved against said spring means to move said pawl out of engagement with said locking surface.

2. A safety hook according to claim 1, the improvement further comprising in having a protective shroud portion on said hook body extending beyond said locking pawl.

3. A safety hook according to claim 1, the improvement further comprising in that said axlepin is barrel shaped, in that said locking surface comprises a slot in one end of said axlepin, in that said pawl comprises a T-shaped pin having a shank portion and a head portion with the head portion of said pin adapted to engage the slot in said axlepin and to engage a further slot in said hook body to lock said latch against rotational movement with respect to said hook body.

4. A safety hook according to claim 3, the improvement further comprising in that said shank portion of said T-shaped pin extends through said barrel shaped axlepin with said spring means surrounding said shank portion and bearing on a shoulder on said axlepin and a shoulder on said T-shaped pin to urge said head portion into the slot on the end of the axlepin.

5. A safety hook according to claim 4, the improvement further comprising in that the T-shaped pin has a push button on the end of said shank portion opposite said head portion whereby said pin may be moved against the force of said spring to move the head portion out of the slot in the end of said axlepin whereby said latch may be moved to an open position with respect to said hook body.

6. A safety hook according to claim 1, the improvement further comprising in that said pawl is rotatably mounted on a side of said hook body and wherein said spring engages a shoulder on said hook body and a shoulder on said pawl to urge said pawl into rotational engagement with said locking surface.

7. A safety hook according to claim 1, the improvement further comprising in that said pawl comprises a push button, a mounting pin on a side of said hook body on which said push button is slidably mounted and wherein said spring means urges said push button outwardly of said hook body to engage said locking surface.

8. A safety hook according to claim 1, the improvement further comprising in having a pawl mounting pin extending between the two spaced ear portions with said pawl being rotatably mounted on said mounting pin between the two spaced ear portions.

* * * * *